US009713974B2

(12) United States Patent
Mussi et al.

(10) Patent No.: US 9,713,974 B2
(45) Date of Patent: Jul. 25, 2017

(54) VEHICLE SEAT WITH HEAD AND NECK SUPPORT

(71) Applicants: Edward F Mussi, Saline, MI (US); James W Finck, Clarkston, MI (US)

(72) Inventors: Edward F Mussi, Saline, MI (US); James W Finck, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 42 days.

(21) Appl. No.: 14/920,978

(22) Filed: Oct. 23, 2015

(65) Prior Publication Data

US 2017/0113581 A1 Apr. 27, 2017

(51) Int. Cl.
*B60N 2/48* (2006.01)
(52) U.S. Cl.
CPC ......... *B60N 2/4805* (2013.01); *B60N 2/4838* (2013.01)
(58) Field of Classification Search
CPC ...... B60N 2/4805; B60N 2/4838; B60N 2/48; A47C 7/38; A47C 7/383
See application file for complete search history.

(56) References Cited

U.S. PATENT DOCUMENTS

| 3,795,021 A * | 3/1974 | Moniot | A47C 7/38 297/284.1 |
|---|---|---|---|
| 4,440,443 A * | 4/1984 | Nordskog | A47C 7/38 297/217.4 |
| 4,720,146 A | 1/1988 | Mawbey et al. | |
| 4,865,388 A * | 9/1989 | Nemoto | B60N 2/487 297/403 |
| 5,181,763 A | 1/1993 | Dellanno et al. | |
| 5,772,281 A * | 6/1998 | Massara | B60N 2/4415 297/284.4 |
| 5,842,738 A | 12/1998 | Knoll et al. | |
| 5,975,637 A * | 11/1999 | Geuss | B60N 2/002 297/216.12 |
| 6,079,776 A * | 6/2000 | Breitner | B60N 2/4838 297/216.12 |
| 6,158,812 A * | 12/2000 | Bonke | B60N 2/4805 297/216.12 |
| 6,203,105 B1 * | 3/2001 | Rhodes, Jr. | A47C 4/54 297/284.1 |
| 6,402,238 B1 * | 6/2002 | Bigi | B60N 2/427 280/730.1 |
| 6,474,733 B1 | 11/2002 | Heilig et al. | |
| 6,568,754 B1 * | 5/2003 | Norton | B60N 2/4864 297/216.12 |

(Continued)

*Primary Examiner* — Timothy J Brindley
(74) *Attorney, Agent, or Firm* — Ralph E. Smith

(57) ABSTRACT

A vehicle seat includes a seat base, a backrest, a head restraint, and a pump. The backrest is coupled to the seat base. The head restraint includes a rigid backing member, a padding, an inflatable bladder, and a cover. The backing member is coupled to the backrest. The padding is coupled to the backing member and disposed at least along a forward face of an upper portion of the backing member. The inflatable bladder is coupled to the backing member and disposed along a forward face of a lower portion of the backing member. The padding and the inflatable bladder are disposed between the backing member and the cover. The pump is coupled for fluid communication with the inflatable bladder. The bladder is selectively inflated or deflated to improve the comfort of the head restraint.

19 Claims, 5 Drawing Sheets

(56) References Cited

U.S. PATENT DOCUMENTS

| | | | | |
|---|---|---|---|---|
| 7,213,883 B2 * | 5/2007 | Charnitski | ............ | B60N 2/4882 |
| | | | | 297/391 |
| 7,293,828 B2 * | 11/2007 | Yoshida | ............... | B60N 2/2851 |
| | | | | 280/730.1 |
| 7,695,015 B2 | 4/2010 | Breed | | |
| 2010/0299838 A1 * | 12/2010 | Lanci | ..................... | A47C 7/383 |
| | | | | 5/645 |
| 2011/0198899 A1 * | 8/2011 | Hertl | ........................ | B60N 2/48 |
| | | | | 297/216.12 |
| 2016/0129815 A1 * | 5/2016 | Kolich | ................ | B60N 2/4805 |
| | | | | 297/391 |

* cited by examiner (1)

VEHICLE SEAT WITH HEAD AND NECK SUPPORT

FIELD

The present disclosure relates to a vehicle seat with head and neck support.

BACKGROUND

This section provides background information related to the present disclosure and is not necessarily prior art.

Vehicle seats typically include a head restraint (commonly known as a headrest) that is designed to limit movement of an occupant's head during a rear collision event. Such head restraints can also provide support for the occupant's head to reduce fatigue during long durations in the vehicle, or when the occupant desires to rest while sitting in the seat. Head restraints are typically adjustable up or down between a plurality of fixed positions to accommodate occupants of varying heights. However, the head restraints typically have a fixed shape that some occupants can find to be uncomfortable or less desirable during certain driving or resting conditions. As a result, some occupants resort to moving the head restraint to positions that are less optimal for rear collisions.

SUMMARY

This section provides a general summary of the disclosure, and is not a comprehensive disclosure of its full scope or all of its features.

In accordance with an aspect of the present disclosure, a vehicle seat includes a seat base, a backrest, a head restraint, and a pump. The backrest is coupled to the seat base. The head restraint includes a rigid backing member, a padding, an inflatable first bladder, and a cover. The backing member is coupled to the backrest. The padding is coupled to the backing member and disposed at least along a forward face of an upper portion of the backing member. The first bladder is coupled to the backing member and disposed along a forward face of a lower portion of the backing member. The padding and the first bladder are disposed between the backing member and the cover. The pump is coupled for fluid communication with the first bladder.

In accordance with an aspect of the present disclosure, the vehicle seat further includes a control unit in communication with the pump and configured to operate the pump to selectively inflate the first bladder.

In accordance with an aspect of the present disclosure, the vehicle seat further includes a user interface in communication with the control unit. The user interface is configured to permit a user to control the pump to adjust an inflation level of the first bladder.

In accordance with an aspect of the present disclosure, at least one valve is in communication with the control unit. The control unit is configured to operate the at least one valve in a first mode wherein fluid communication from the pump to the first bladder is permitted, a second mode wherein fluid communication from the first bladder is inhibited, and a third mode wherein fluid is permitted to vent from the first bladder to air surrounding the vehicle seat.

In accordance with an aspect of the present disclosure, the padding extends along the lower portion of the backing member between the cover and the first bladder.

In accordance with an aspect of the present disclosure, the first bladder has a left region proximate to a left side of the head restraint, a right region proximate to a right side of the head restraint, and a center region located between the left and right regions. The left and right regions each are configured to hold a greater volume than the center region.

In accordance with an aspect of the present disclosure, the center region fluidly couples the left and right regions.

In accordance with an aspect of the present disclosure, the head restraint further includes a frame and a tilt mechanism. The frame is coupled to the backrest. The tilt mechanism couples the backing member to the frame and is configured to rotate the backing member relative to the frame.

In accordance with an aspect of the present disclosure, the tilt mechanism includes a coupling member, a slide member, a motor, and an arm. The coupling member has a rearward end pivotably coupled to the frame and a forward end pivotably coupled to the backing member. The slide member is slidably coupled to the frame. The motor is fixedly coupled to the backing member and has an output shaft. The arm has a forward portion and a rearward portion. The forward portion is fixedly coupled to the output shaft. The rearward portion is pivotably coupled to the slide member.

In accordance with an aspect of the present disclosure, the vehicle seat further includes an inflatable second bladder disposed within one of the backrest or the seat base. The pump is coupled for fluid communication with the second bladder.

In accordance with an aspect of the present disclosure, the vehicle seat further includes at least one valve in fluid communication with the first bladder and the second bladder. The at least one valve is configured to operate in a plurality of modes to selectively permit and inhibit fluid communication between the pump, the second bladder, and the first bladder.

In accordance with an aspect of the present disclosure, a vehicle seat includes a seat base, a backrest, and a head restraint. The backrest is coupled to the seat base. The head restraint includes a frame, a rigid backing member, a padding, and a tilt mechanism. The frame is coupled to the backrest. The padding is coupled to the backing member. The tilt mechanism couples the backing member to the frame and is configured to rotate the backing member relative to the frame. The tilt mechanism includes a coupling member, a slide member, a motor, and an arm. The coupling member has a rearward end pivotably coupled to the frame and a forward end pivotably coupled to the backing member. The slide member is slidably coupled to the frame. The motor is fixedly coupled to the backing member and has an output shaft. The arm has a forward portion and a rearward portion. The forward portion is fixedly coupled to the output shaft. The rearward portion is pivotably coupled to the slide member In accordance with an aspect of the present disclosure, the vehicle seat further includes a pump and the head restraint further includes an inflatable first bladder and a cover. The first bladder is coupled to the backing member and disposed along a forward face of a lower portion of the backing member. The pump is coupled for fluid communication with the first bladder. The padding and first bladder are disposed between the backing member and the cover.

In accordance with an aspect of the present disclosure, the vehicle seat further includes a control unit in communication with the pump and configured to operate the pump to selectively inflate the first bladder.

In accordance with an aspect of the present disclosure, the vehicle seat further includes a user interface in communication with the control unit. The user interface is configured to permit a user to control the pump to adjust an inflation level of the first bladder.

In accordance with an aspect of the present disclosure, the vehicle seat further includes at least one valve in communication with the control unit. The control unit is configured to operate the at least one valve in a first mode wherein fluid communication from the pump to the first bladder is permitted, a second mode wherein fluid communication from the first bladder is inhibited, and a third mode wherein fluid is permitted to vent from the first bladder to air surrounding the vehicle seat.

In accordance with an aspect of the present disclosure, the padding extends along the lower portion of the backing member between the cover and the first bladder.

In accordance with an aspect of the present disclosure, the first bladder has a left region proximate to a left side of the head restraint, a right region proximate to a right side of the head restraint, and a center region located between the left and right regions. The left and right regions each are configured to hold a greater volume than the center region.

In accordance with an aspect of the present disclosure, the center region fluidly couples the left and right regions.

In accordance with an aspect of the present disclosure, the vehicle seat further includes an inflatable bladder disposed within one of the backrest or the seat base. The pump is coupled for fluid communication with the second bladder.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

The present teachings are directed toward a vehicle seat including a head and neck support (i.e. a head restraint or headrest) that includes an inflation system and a tilt mechanism. The inflation system is configured to selectively and adjustably inflate a bladder in the head restraint to expand or contract a portion of the head restraint to support an occupant's neck to improve the occupant's comfort. The degree of inflation is adjustable based on the occupant's preferences. The tilt mechanism selectively and adjustably tilts the head restraint relative to the rest of the vehicle seat to further improve the occupant's comfort.

Figure 1:
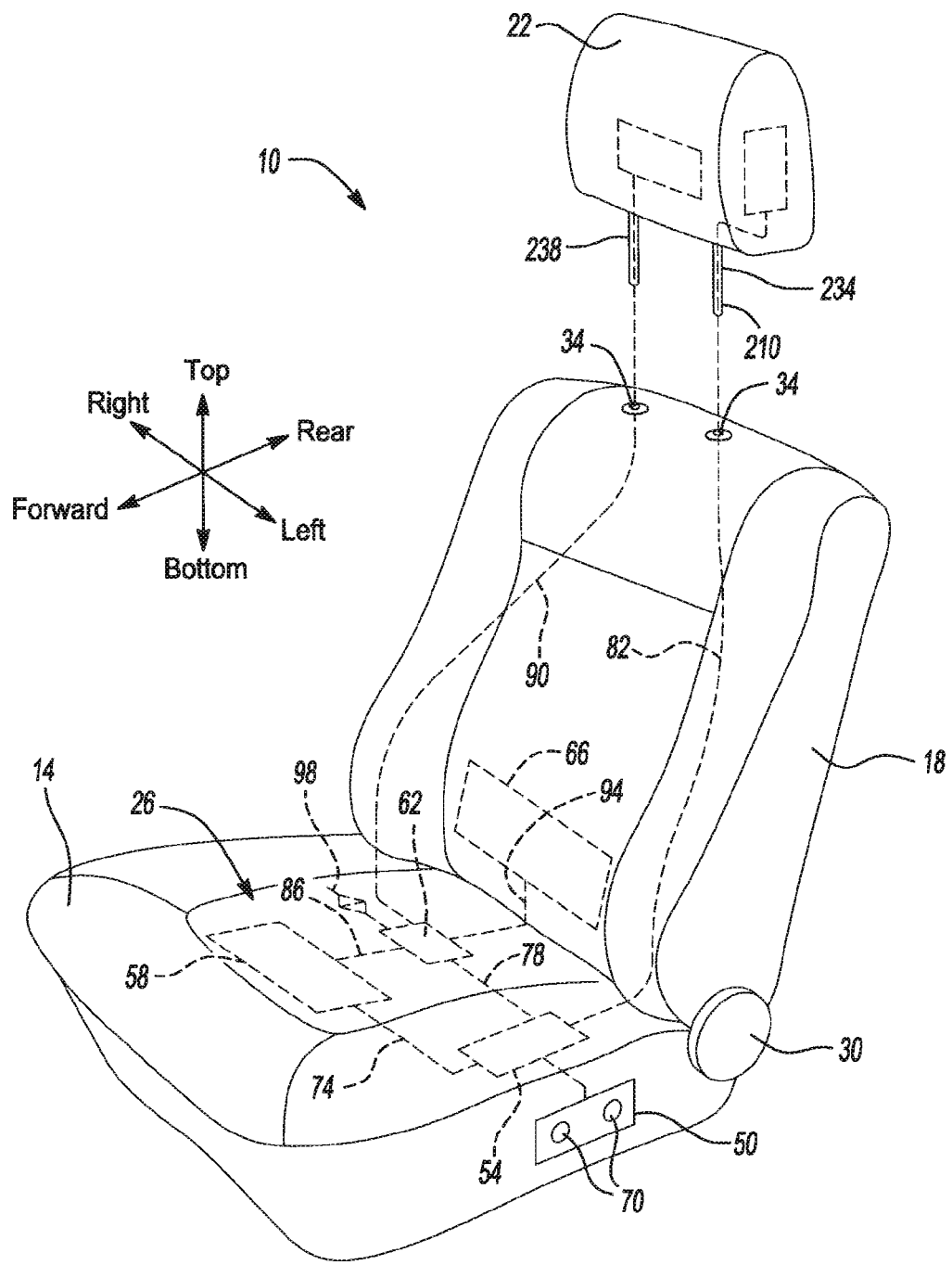
FIG. 1 is a perspective view of a vehicle seat including a head restraint in accordance with the present teachings.

With reference to FIG. 1, a vehicle seat 10 generally includes a seat base 14, a back support or backrest 18, a head support or head restraint 22, and an adjustment system 26. The seat base 14 is configured to be coupled to a floor of a vehicle (not shown) and to support an occupant 610 (FIGS. 6 and 7) vertically above the vehicle's floor.

The backrest 18 is coupled to the seat base 14 in a conventional manner to provide support for the occupant's 610 (FIGS. 6 and 7) back and shoulders when the occupant 610 (FIGS. 6 and 7) sits upon the seat base 14. In the example provided, the backrest 18 is coupled to the seat base 14 by a seat mechanism 30 that selectively permits the backrest 18 to rotate or recline in a conventional manner relative to the seat base 14. The backrest 18 includes a pair of apertures 34 located at the top of the backrest 18. The head restraint 22 is coupled to the top of the backrest 18 via the apertures 34 to provide support for the occupant's 610 head 614 and neck 618 (FIGS. 6 and 7) as described below.

Figure 2:
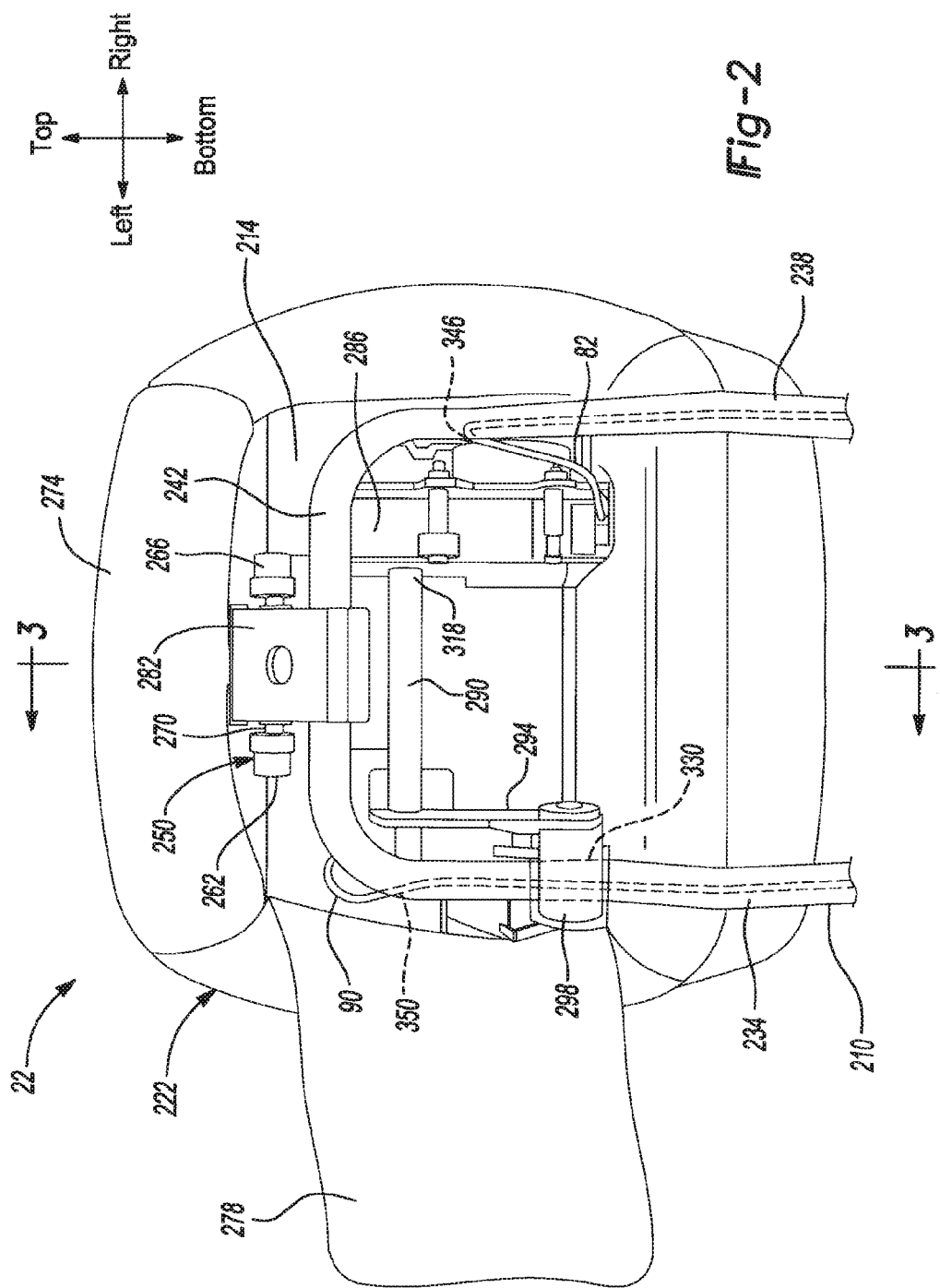
FIG. 2 is a rear cut-away view of the head restraint of FIG. 1, illustrating a tilt mechanism.
Figure 3:
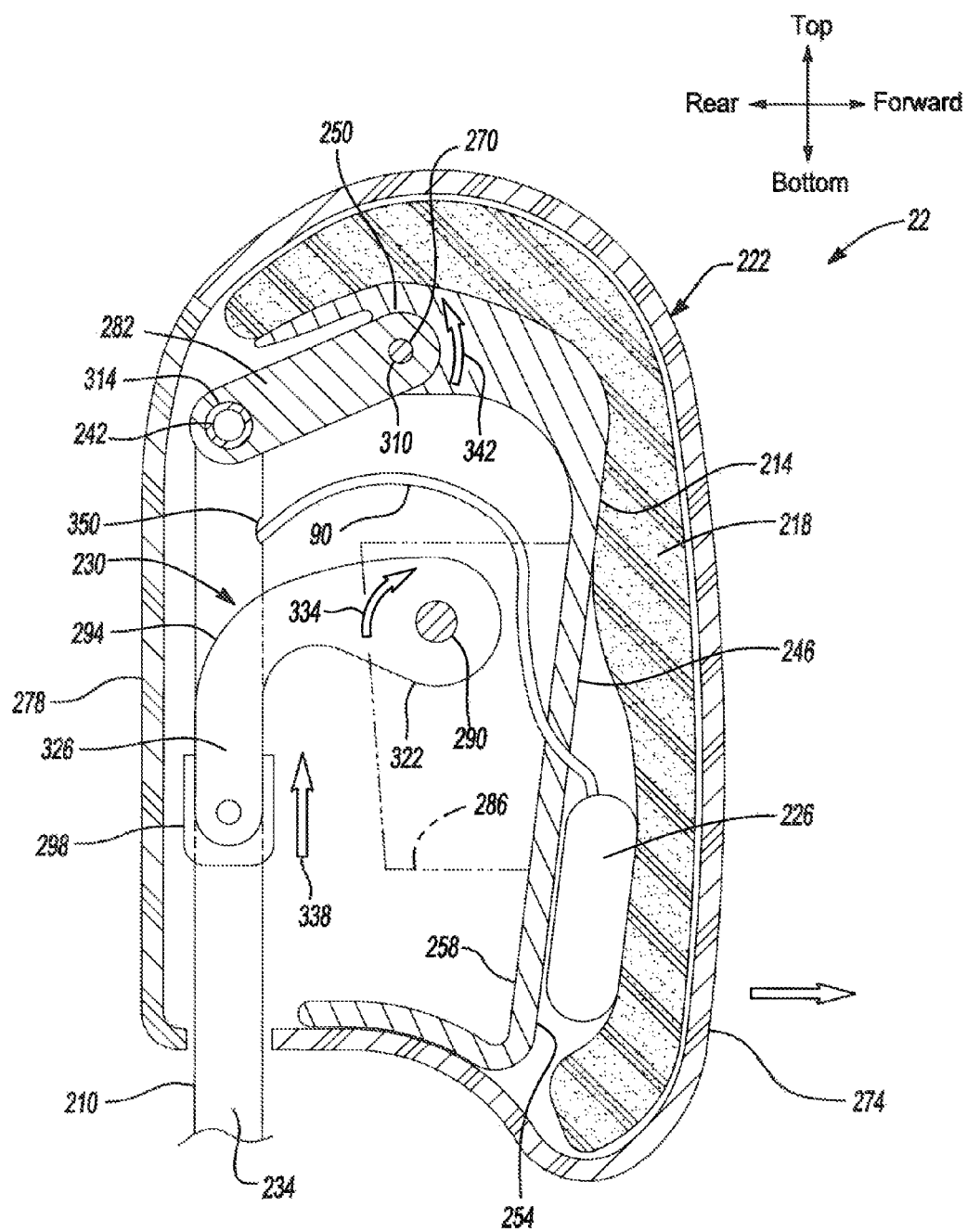
FIG. 3 is a sectional view of the head restraint of FIG. 1, taken along line 3-3 shown on FIG. 2.

With additional reference to FIGS. 2 and 3, the head restraint 22 generally includes a frame 210, a backing member 214, a padding 218, a cover 222, a bladder 226, and a tilt mechanism 230. The frame 210 generally couples the head restraint 22 to the backrest 18. In the example provided, the frame 210 is a rigid, hollow, tubular member. The frame 210 has a left prong 234, a right prong 238 spaced apart from the left prong 234, and a cross-member 242 that extends between and couples the tops of the left and right prongs 234, 238 such that the frame 210 generally has a "U" shape. The left and right prongs 234, 238 are each received in a respective one of the apertures 34 (FIG. 1) in the top of the backrest 18 (FIG. 1). The left and right prongs 234, 238 and the apertures 34 cooperate in a conventional manner, such as with a locking mechanism (not specifically shown) to permit the head restraint 22 to be selectively locked in place or moved up or down relative to the backrest 18 between a variety of vertical positions. The head restraint 22 can be moved up or down relative to the backrest 18 manually or by a drive mechanism (not shown) that can include one or more motors (not shown).

The backing member 214 is a rigid body that generally supports the padding 218 within the head restraint 22 and is movably coupled to the frame 210 by the tilt mechanism 230, as discussed below. In the example provided, the backing member 214 includes a generally rigid, thin plate 246 and a bracket 250. In the example provided, the backing member 214 is formed of a plastic material, though other generally rigid materials can be used. In the example provided, the plate 246 has a front face 254 and a back face 258. The bracket 250 is coupled to the back face 258 of the plate 246. In the example provided, the bracket 250 includes a left protrusion 262, a right protrusion 266, and a cylindrical pin 270 that is coupled to and extends between the left and right protrusions 262, 266 to be parallel to the cross-member 242. In the example provided, the pin 270 is located vertically above the cross-member 242 and forward of the cross-member 242.

The padding 218 is formed of a resilient material. In the example provided, the padding 218 is a foam material, though other suitable materials can be used. The padding 218 is fixedly coupled to the front face 254 of the plate 246 and extends from the bottom of the plate 246 up to the top of the plate 246 such that the padding 218 is between the occupant's 610 head 614 (FIGS. 6 and 7) and the rigid plate 246.

Figure 7:
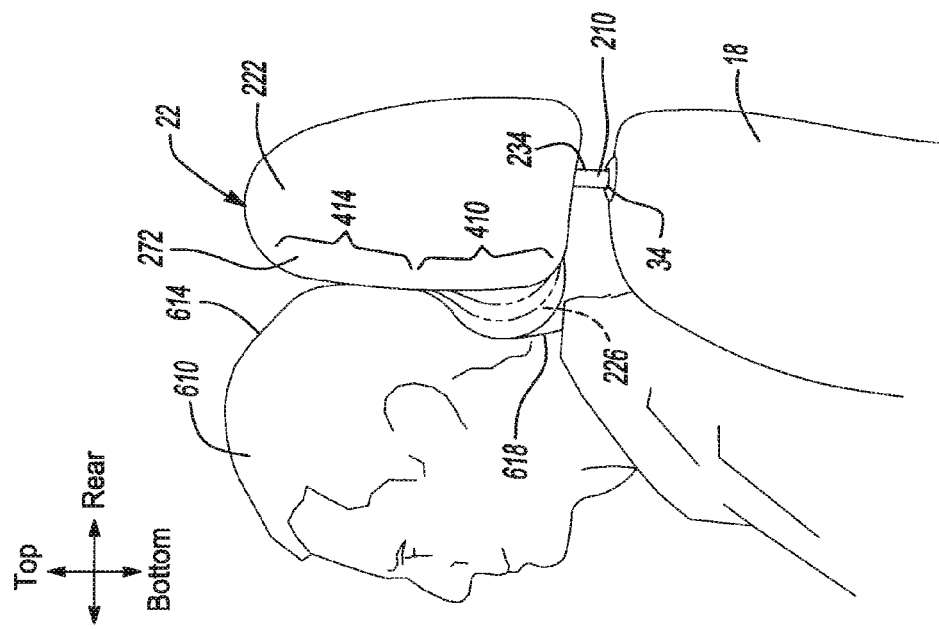
FIG. 7 is a side view similar to FIG. 6, illustrating the head restraint in an inflated state.
Figure 6:
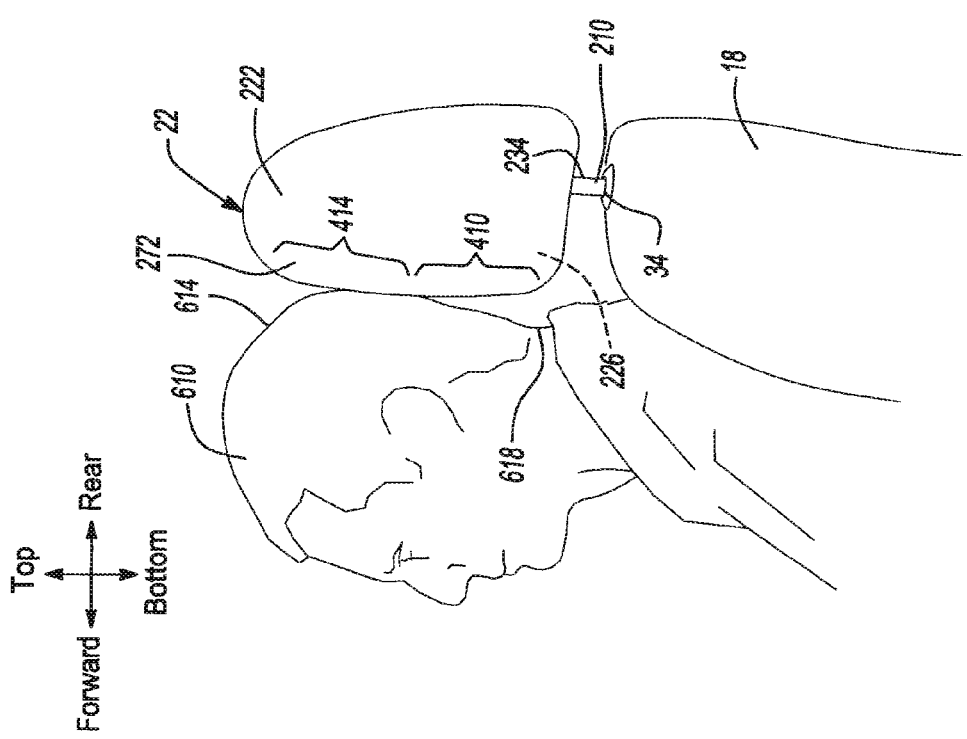
FIG. 6 is a side view of a portion of the vehicle seat of FIG. 1, illustrating the head restraint in a deflated state.

The cover 222 generally wraps the head restraint 22 to form an outer layer that separates the occupant (FIGS. 6 and 7) from the padding 218 and the frame 210. The cover 222 can be formed of any suitable material, blend, or combination of materials, such as cotton, leather, spandex, or other synthetic materials for example, and can be upholstered in any suitable manner. The cover 222 includes a front cover 274 and a back cover 278. The front cover 274 is generally less flexible than the back cover 278, but is a material that is more desirable for contact with the occupant's 610 head 614 (FIGS. 6 and 7). In the example provided, the front cover 274 is a leather material and the back cover 278 is a resilient material (e.g. spandex) that can stretch and return to its natural size. In FIG. 2, the back cover 278 is shown pulled back and detached from the top, bottom, and right sides of the head restraint 22 for illustration purposes to show the frame 210 and tilt mechanism 230. In operation, the back cover 278 is attached to the top, bottom, left and right sides of the head restraint 22 to visually conceal the frame 210 and tilt mechanism 230 within the head restraint 22.

The bladder 226 is a hollow body that is formed of a resilient material such as thermoplastic urethane, polyethylene, polyolefin, or polyvinylchloride for example, that can be repeatedly filled and evacuated with a liquid or gas (e.g. air). In the example provided, the bladder 226 is located between the front face 254 of the plate 246 and the padding 218, proximate to the bottom of the head restraint 22. In an alternative construction, not specifically shown, the bladder 226 is located between the padding 218 and the cover 222. In another alternative construction, not specifically shown, the padding is generally defines a cavity and the bladder 226 is received in the cavity of the padding. In yet another alternative construction, not specifically shown, a second type of padding that is stiffer than the padding 218 is located between the plate 246 and the bladder 226, and the padding 218 is located between the bladder and the cover 222.

Figure 4:
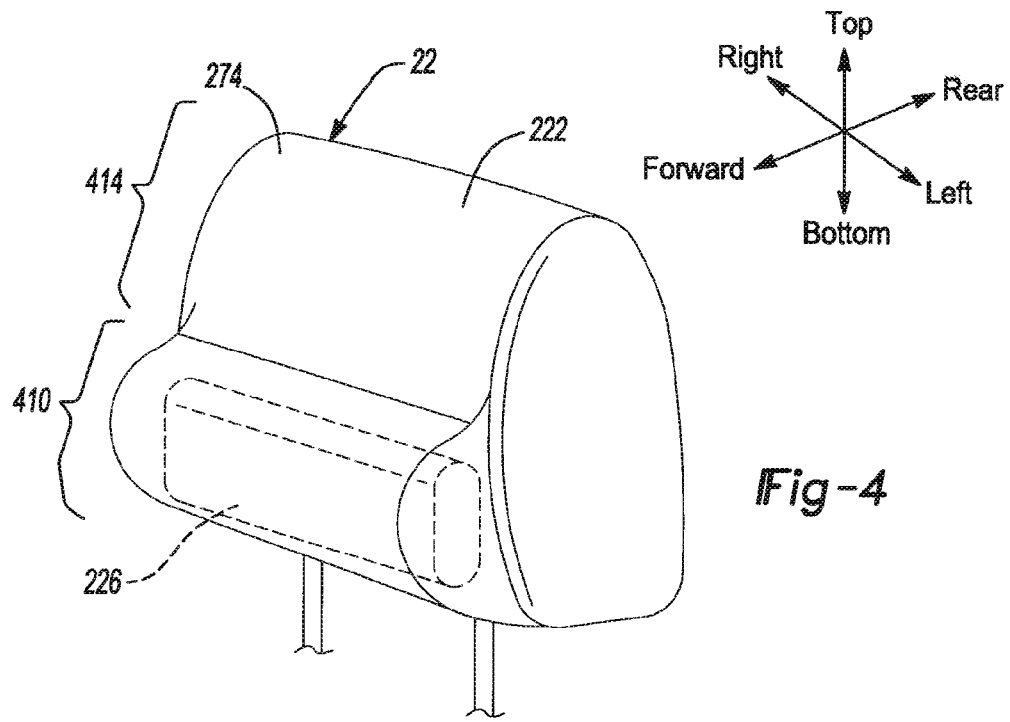
FIG. 4 is a perspective view of the head restraint of FIG. 1, illustrated in an inflated state.

With additional reference to FIG. 4, the bladder 226 is shown in an inflated state. In the inflated state, the cover 222 remains between the occupant 610 (FIGS. 6 and 7) and the bladder 226. In the example provided, the bladder 226 is constructed to expand to form a generally cylindrical shape, longitudinally extending from the left to the right sides of the head restraint 22 when air is pumped into the bladder 226. In the example provided, the bladder 226 expands to force a lower portion 410 of the front cover 274 forward relative to an upper portion 414 of the front cover 274 in a uniform manner across the width of the head restraint 22 (i.e. from the left to the right side).

Figure 5:
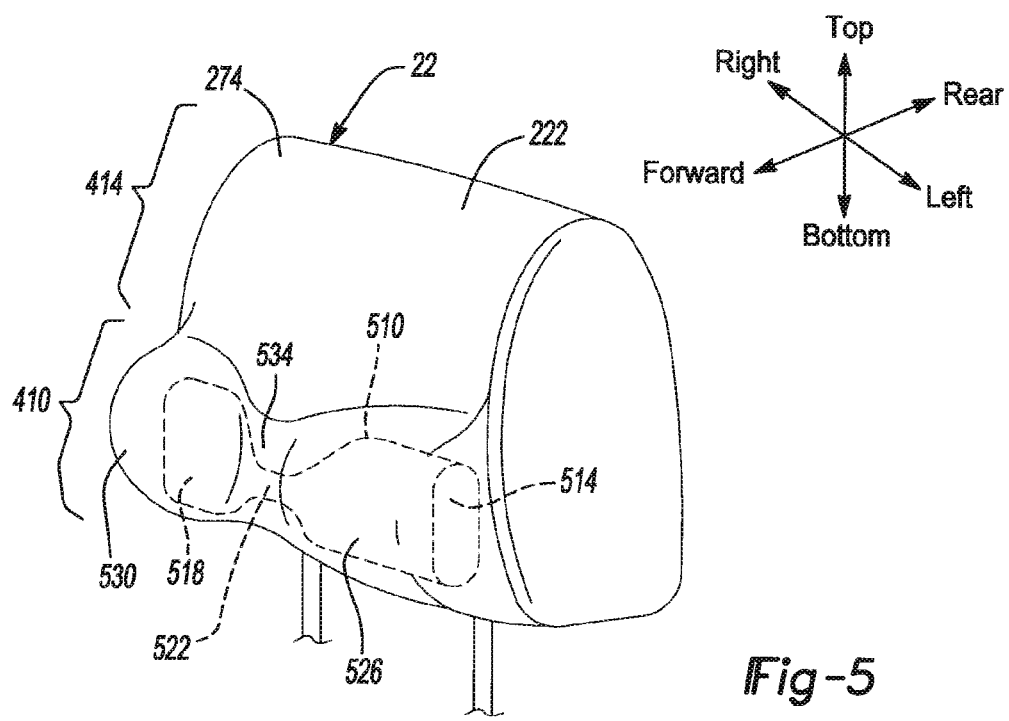
FIG. 5 is a perspective view of a head restraint of a second construction and in an inflated state.

With additional reference to FIG. 5, a bladder 510 of an alternative construction is shown in the head restraint 22. The bladder 510 is similar to the bladder 226 except as otherwise shown or described herein. The bladder 510 is shown in an inflated state. The bladder 510 is constructed to expand to form a generally hour-glass shape, having a left region or bulb 514, a right region or bulb 518, and a bridge 522 when air is pumped into the bladder 510. The left bulb 514 is located proximate to the left side of the head restraint 22. The right bulb 518 is located proximate to the right side of the head restraint 22. In the example provided, the left and right bulbs 514, 518 are configured to hold the same volume of air. The bridge 522 is narrower (i.e. configured to hold a lesser volume of air) than the left and right bulbs 514, 518 and fluidly couples the left bulb 514 with the right bulb 518. When the bladder 510 is inflated, the bladder 510 expands to force the lower portion 410 of the front cover 274 forward relative to the upper portion 414 of the front cover 274. A left area 526 and a right area 530 of the lower portion 410 of the front cover 274 extend farther forward than a central area 534 of the lower portion 410. This allows the central area 534 to cradle the occupant's 610 neck 618 (FIGS. 6 and 7) while inhibiting left and right movement of the occupant's 610 neck 618 (FIGS. 6 and 7). In an alternative construction, not specifically shown, two or more separate bladders are used to form left and right bulbs 514, 518 or other shapes as desired.

Returning to FIGS. 2 and 3, the tilt mechanism 230 includes a coupling member 282, a drive mechanism 286, a rod 290, an arm 294, and a slider 298. The coupling member 282 couples the plate 246 to the frame 210 such that the plate 246 is rotatable relative to the frame 210. A forward end of the coupling member 282 is pivotably coupled to the bracket 250 and a rearward end of the coupling member 282 is pivotably coupled to the cross-member 242. In the example provided, the forward end of the coupling member 282 defines a forward aperture 310 and the pin 270 of the bracket 250 is received through the forward aperture 310 to rotatably couple the coupling member 282 to the plate 246. In the example provided, the rearward end of the coupling member 282 defines a rearward aperture 314 and the cross-member 242 is received through the rearward aperture 314 to rotatably couple the coupling member 282 to the frame 210.

The drive mechanism 286 is fixedly mounted to the back face 258 of the plate 246. In the example provided, the drive mechanism 286 is fixedly mounted to the plate 246 proximate to a right side of the plate 246 though other configurations can be used. In the example provided, the drive mechanism 286 is a DC servo motor and reduction gearset capable of providing precise output rotation in both forward and reverse rotational directions, though other suitable types of drive mechanisms can be used. The drive mechanism 286 has an output member 318 that is rotated when the drive mechanism 286 receives electrical power. The rod 290 is coupled for common rotation with the output member 318 such that operation of the drive mechanism 286 rotates the rod 290. In the example provided, the rod 290 is fixedly coupled to the output member 318 proximate to the right side of the head restraint 22, extends longitudinally across the center of the head restraint 22 and is fixedly coupled to the arm 294 proximate to the left side of the head restraint 22.

The arm 294 is a rigid member having a forward portion 322 and a rearward portion 326. The forward portion 322 and rearward portion 326 form a generally "L" or dog-leg shape with the forward portion 322 forward of the rearward portion 326. In the example provided, the forward portion 322 extends longitudinally from the rearward portion 326 at approximately 90° relative to the longitudinal direction of the rearward portion 326. The forward portion 322 is fixedly coupled to the rod 290 for rotation therewith. The rearward portion 326 is rotatably coupled to the slider 298. The slider 298 defines a slider aperture 330. The left prong 234 is slidably received through the slider aperture 330 such that the slider 298 slides up and down on the left prong 234.

In operation, when the drive mechanism 286 is operated to rotate the output member 318 in a first rotational direction 334, the output member 318 rotates the rod 290 in the first rotational direction 334. The rod 290 rotates the arm 294 in the first rotational direction 334, which causes the slider 298 to slide along the left prong 234 in an upward direction 338. Since the left prong 234 is fixed in the forward/rearward directions relative to the backrest 18 (FIG. 1), the arm 294, rod 290, drive mechanism 286, and plate 246 are caused to move forward. As the plate 246 moves forward, the coupling member 282 rotates in a second rotational direction 342, causing the plate 246 to tilt such that the bottom of the plate 246 moves forward relative to the top of the plate 246. When the drive mechanism 286 is operated to rotate the output member 318 in the opposite direction of the first rotational direction 334, the operation is reversed and the plate 246 tilts such that the bottom of the plate 246 moves backward relative to the top of the plate 246. The drive mechanism 286 is operated at a speed such that the occupant 610 (FIGS. 6 and 7) can accurately adjust the angled position of the head restraint 22 to find the most comfortable position. In other words, the drive mechanism 286 cannot tilt the head restraint 22 too quickly, or the occupant 610 will be unable to accurately control the position.

Returning to FIG. 1, the adjustment system 26 includes a user interface 50, a control module 54, a pump 58, and a manifold or valve 62. In the example provided, the adjustment system 26 also includes an optional inflatable second bladder 66. The second bladder 66 is a hollow body that is formed of a resilient material such as rubber or latex for example, that can be repeatedly filled and evacuated with a liquid or gas (e.g. air). In the example provided, the second bladder 66 is located within a lower portion of the backrest 18 such that when the occupant 610 (FIGS. 6 and 7) sits in the seat 10, the second bladder 66 aligns with the lumbar region of the occupant's 610 (FIGS. 6 and 7) back. The second bladder 66 is configured to be selectively expanded or contracted, as described below, to provide adjustable support to the lumbar region of the backrest 18. In other configurations, not specifically shown, the second bladder 66 can be located in the seat base 14 or other locations in the backrest 18 (e.g. bolster regions of the seat base 14 or backrest 18) to improve the comfort of the seat 10.

The user interface 50 can be any suitable user interface to permit the occupant 610 to control the adjustment system 26, as discussed below. In the example provided, the user interface 50 includes one or more buttons 70, though other input devices can be used such as levers, touchpads, touch screens, or joysticks for example. In the example provided, the user interface 50 is mounted to a side of the seat base 14 in a position accessible to the occupant 610 (FIGS. 6 and 7). In an alternative construction, not specifically shown, the user interface 50 is located elsewhere on the seat 10, such as the backrest 18 for example. In yet another alternative construction, not specifically shown, the user interface 50 is located elsewhere within the vehicle, separate from the seat 10, such as a console, instrument panel, or door of the vehicle for example.

The control module 54 is configured to be in communication with the user interface 50, the pump 58, the valve 62 and the tilt mechanism 230. The control module 54 is configured to receive input signals from the user interface 50 and to send control signals to the pump 58, valve 62, and tilt mechanism. In the example provided, the control module 54 is electrically connected to the pump 58 via a wire or wires 74, electrically connected to the valve 62 via another wire or wires 78, and electrically connected to the tilt mechanism 230 through yet another wire or wires 82, though other configurations can be used. In the example provided the control module 54 is located within the seat base 14. In the example provided, the wire 82 extends from the control module 54, through the backrest 18, and within the hollow center of the right prong 238 of the head restraint 22 frame 210. The wire 82 exits the right prong 238 through an aperture 346 (FIG. 2) in the right prong 238 and is coupled to the drive mechanism 286 (FIG. 2) to provide electrical power thereto.

In operation, the occupant 610 (FIGS. 6 and 7) interacts with the user interface 50 (e.g. operating the buttons 70) to control the operation of the drive mechanism 286 and adjust the tilt angle of the head restraint 22 relative to the backrest 18. The occupant 610 (FIGS. 6 and 7) can adjust the tilt angle of the head restraint 22 to any one of a plurality of angular positions to find the position most comfortable for the occupant 610 (FIGS. 6 and 7).

In an alternative configuration, not specifically shown, the control module 54 is also in communication with another system of the vehicle (e.g. a crash/impact detection or prediction system) and operates the drive mechanism 286 to adjust the tilt angle to an optimal tilt angle for a detected or predicted impact event. In an alternative construction, not specifically shown, the control module 54 is located elsewhere on or within the seat 10, such as in the backrest 18 for example. In yet another alternative construction, not specifically shown, the control module 54 is located elsewhere within the vehicle, separate from the seat 10 such as a console, or instrument panel of the vehicle for example. In another alternative construction, the control module 54 is not included and the user interface 50 are voltage on/off switches to provide power to the drive mechanism 286 and/or the pump 58 and/or the valve 62.

The pump 58 is any suitable type of pump configured to pump a fluid (e.g. a gas or liquid) to the bladder 226 and the second bladder 66. In the example provided, the pump 58 is a pneumatic pump configured to intake air from around the seat 10 and pump the air to the bladder 226. In an alternative construction, not specifically shown, the pump 58 is a reversible pump configured to be operated in an inflate mode to pump a fluid from a fluid reservoir (not shown) to the bladder 226, and a deflate mode to pump the fluid from the bladder 226 back to the fluid reservoir (not shown). In another construction, not specifically shown, the pump 58 is a reversible pump configured to be operated in an inflate mode to pump a fluid from the atmosphere around the seat 10, to the bladder 226, and a deflate mode to pump the fluid from the bladder 226 back to the atmosphere. In the example provided, the pump 58 is coupled for fluid communication with the valve 62 via a conduit 86, and the pump 58 is configured to pump 58 the air through the conduit 86 to the valve 62.

In an alternative construction, not specifically shown, the pump 58 is a one-way pump coupled directly to the bladder 226 via the conduit 86, and a vent or bleed valve is separately attached for fluid communication with the bladder 226 to selectively release air from the bladder 226. In another alternative construction, the pump 58 is a manual pump that can be physically operated by the occupant 610 (FIGS. 6 and 7) to manually pump air into the bladder 226 without the need for an electrically driven pump.

Returning to the example shown, the valve 62 is any suitable type of valve configured to selectively control the flow of fluid from the pump 58 to the bladder 226 and the second bladder 66, and to selectively inhibit flow of the fluid out of the bladder 226 and the second bladder 66. In the example provided, the valve 62 is coupled for fluid communication to the bladder 226 via a conduit 90, and is coupled to the second bladder 66 via a separate conduit 94. In the example provided, the conduit 90 extends up from the valve 62, through the backrest 18, and through the hollow center of the left prong 234 of the head restraint 22 frame 210. The conduit 90 exits the left prong 234 through an aperture 350 (FIGS. 2 and 3) in the left prong 234 and is coupled for fluid communication with the bladder 226 to provide air thereto. In the example provided, the aperture 350 (FIGS. 2 and 3) in the left prong 234 is located above the range of motion of the slider 298 (FIGS. 2 and 3).

In the example provided, the valve 62 is configured to be operable in a plurality of modes to selectively and independently control the flow of air in the system. In a first mode, the valve 62 permits air to flow from the pump 58 to the bladder 226 to inflate the bladder 226. In a second mode, the valve 62 permits air to be released from the bladder 226 through a vent 98 that is coupled to the valve 62, to vent the air to the atmosphere surrounding the seat 10 to deflate the bladder 226. In a third mode, the valve 62 permits air to flow from the pump 58 to the second bladder 66 to inflate the second bladder 66. In a fourth mode, the valve 62 permits air to be released from the second bladder 66 through the vent 98 and to the atmosphere surrounding the seat 10 to deflate the second bladder 66. In this way, the valve 62 can selectively and independently control the flow of air to and from the bladder 226 or to and from the second bladder 66.

In an alternative construction, multiple valves are used. In another alternative construction, where the control module 54 is in communication with an another system of the vehicle (e.g. impact detection or prediction), the control module 54 operates the valve 62 at least partially based on detection or prediction of an impact or crash event. In such a configuration, the valve 62 is controlled to vent air from the bladder 226 when an impact is detected or predicted until the bladder 226 reaches an optimal inflation level for such an impact event.

With additional reference to FIGS. 6 and 7, the occupant 610 is able to interact with the user interface 50 (e.g. moving the buttons 70 shown in FIG. 1) to selectively adjust the amount of air within the bladder 226 (FIGS. 1, 3, 4). The occupant 610 is able to slowly inflate or deflate the bladder 226 (FIGS. 1, 3, 4) through a plurality of inflation levels (generally indicated by dashed lines in FIG. 7) until the occupant 610 finds the most comfortable amount of neck 618 and head 614 support for that occupant 610. The occupant 610 is able to continually inflate or deflate the bladder 226 to suit the occupant's 610 support and comfort needs. The tilt mechanism 230 (FIGS. 1, 2, 3) and the bladder 226 (FIGS. 1, 3, 4) can be adjusted in a coordinated manner to find the most comfortable position for the occupant 610. The most comfortable position for the occupant 610 can be one where the head restraint 22 supports the occupant's 610 head 614 and neck 618 to relieve stress and strain on the muscles that support the occupant's head 614.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The descriptions above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle seat comprising:
   a seat base;
   a backrest coupled to the seat base;
   a head restraint including:
      a rigid backing member coupled to the backrest;
      a padding coupled to the backing member and disposed at least along a forward face of an upper portion of the backing member;
      an inflatable first bladder coupled to the backing member and disposed along a forward face of a lower portion of the backing member; and
      a cover, the padding and first bladder being disposed between the backing member and the cover;
   a pump coupled for fluid communication with the first bladder;
   a frame that is coupled to the backrest; and
   a tilt mechanism that couples the backing member to the frame and is configured to rotate the backing member relative to the frame.

2. The vehicle seat of claim 1, further comprising:
   a control unit in communication with the pump and configured to operate the pump to selectively inflate the first bladder.

3. The vehicle seat of claim 2, further comprising:
   a user interface in communication with the control unit, the user interface being configured to permit a user to control the pump to adjust an inflation level of the first bladder.

4. The vehicle seat of claim 2, further comprising:
   at least one valve in communication with the control unit;
   wherein the control unit is configured to operate the at least one valve in a first mode wherein fluid communication from the pump to the first bladder is permitted, a second mode wherein fluid communication from the first bladder is inhibited, and a third mode wherein fluid is permitted to vent from the first bladder to air surrounding the vehicle seat.

5. The vehicle seat of claim 1, wherein the padding extends along the lower portion of the backing member between the cover and the first bladder.

6. The vehicle seat of claim 1, wherein the first bladder has a left region proximate to a left side of the head restraint, a right region proximate to a right side of the head restraint, and a center region located between the left and right regions, the left and right regions each being configured to hold a greater volume than the center region.

7. The vehicle seat of claim 6, wherein the center region fluidly couples the left and right regions.

8. The vehicle seat of claim 1, wherein the tilt mechanism includes:
   a coupling member having a rearward end pivotably coupled to the frame and a forward end pivotably coupled to the backing member;
   a slide member slidably coupled to the frame;
   a motor fixedly coupled to the backing member, the motor having an output shaft; and
   an arm having a forward portion and a rearward portion, the forward portion being fixedly coupled to the output shaft, the rearward portion being pivotably coupled to the slide member.

9. The vehicle seat of claim 1, further comprising:
   an inflatable second bladder disposed within one of the backrest or the seat base, the pump being coupled for fluid communication with the second bladder.

10. The vehicle seat of claim 9, further comprising:
    at least one valve in fluid communication with the first bladder and the second bladder, the at least one valve being configured to operate in a plurality of modes to selectively permit and inhibit fluid communication between the pump, the second bladder, and the first bladder.

11. A vehicle seat comprising:
    a seat base;
    a backrest coupled to the seat base; and
    a head restraint including:
       a frame coupled to the backrest;
       a rigid backing member;
       a padding coupled to the backing member; and
       a tilt mechanism that couples the backing member to the frame and is configured to rotate the backing member relative to the frame, the tilt mechanism including:
          a coupling member having a rearward end pivotably coupled to the frame and a forward end pivotably coupled to the backing member;
          a slide member slidably coupled to the frame;
          a motor fixedly coupled to the backing member, the motor having an output shaft; and
          an arm having a forward portion and a rearward portion, the forward portion being fixedly coupled to the output shaft, the rearward portion being pivotably coupled to the slide member.

12. The vehicle seat of claim 11, further comprising:
    a pump;
    wherein the head restraint further includes:
       an inflatable first bladder coupled to the backing member and disposed along a forward face of a lower portion of the backing member, the pump being coupled for fluid communication with the first bladder; and
       a cover, the padding and first bladder being disposed between the backing member and the cover.

13. The vehicle seat of claim 12, further comprising:
    a control unit in communication with the pump and configured to operate the pump to selectively inflate the first bladder.

14. The vehicle seat of claim 13, further comprising:
    a user interface in communication with the control unit, the user interface being configured to permit a user to control the pump to adjust an inflation level of the first bladder.

15. The vehicle seat of claim 14, further comprising:
    at least one valve in communication with the control unit;
    wherein the control unit is configured to operate the at least one valve in a first mode wherein fluid communication from the pump to the first bladder is permitted, a second mode wherein fluid communication from the first bladder is inhibited, and a third mode wherein fluid is permitted to vent from the first bladder to air surrounding the vehicle seat.

16. The vehicle seat of claim 12, wherein the padding extends along the lower portion of the backing member between the cover and the first bladder.

17. The vehicle seat of claim 12, wherein the first bladder has a left region proximate to a left side of the head restraint, a right region proximate to a right side of the head restraint, and a center region located between the left and right regions, the left and right regions each being configured to hold a greater volume than the center region.

18. The vehicle seat of claim 17, wherein the center region fluidly couples the left and right regions.

19. The vehicle seat of claim 12, further comprising:
an inflatable second bladder disposed within one of the backrest or the seat base, the pump being coupled for fluid communication with the second bladder.

* * * * *